United States Patent [19]

Maruyama et al.

[11] Patent Number: 5,006,058
[45] Date of Patent: Apr. 9, 1991

[54] APPARATUS FOR INJECTION MOLDING INFORMATION RECORDING DISKS

[75] Inventors: Haruhisa Maruyama; Ken-ichi Ishiguro; Hiroaki Watanabe; Osamu Yagisawa, all of Yamanashi, Japan

[73] Assignee: Pioneer Electronic Corporation, Tokyo, Japan

[21] Appl. No.: 280,920

[22] Filed: Dec. 7, 1988

[30] Foreign Application Priority Data

Dec. 19, 1987 [JP] Japan ................................ 62-322508
Jun. 9, 1988 [JP] Japan ................................ 63-142626

[51] Int. Cl.⁵ .............................................. B29C 45/43
[52] U.S. Cl. ................................... 425/556; 264/106; 264/335; 425/437; 425/577; 425/810
[58] Field of Search ............... 425/553, 554, 556, 577, 425/437, 444, 810; 264/106, 107, 335

[56] References Cited

U.S. PATENT DOCUMENTS 4,500,486  2/1985  Rascle et al. .................. 425/437

FOREIGN PATENT DOCUMENTS 2174122  7/1987  Japan .................................. 425/810

Primary Examiner—Timothy Heitbrink
Attorney, Agent, or Firm—Sughrue, Mion, Zinn, Macpeak & Seas

[57] ABSTRACT

An apparatus for injection molding a substrate of an information recording disk in which melted molding material is injected into a mold space after a pair of mold bodies are clamped together. An uneven surface area is provided between a cutting device for cutting the cured molding material at the molding surface and an aperture for supplying the pressurized gas for causing the cured molding material to be released. The flow of pressurized gas through the cut portion of the cured molding material is prevented and force is generated by the pressurized gas causing the cured molding material and a stamper forming the molding surface to release uniformly from the mold.

9 Claims, 5 Drawing Sheets

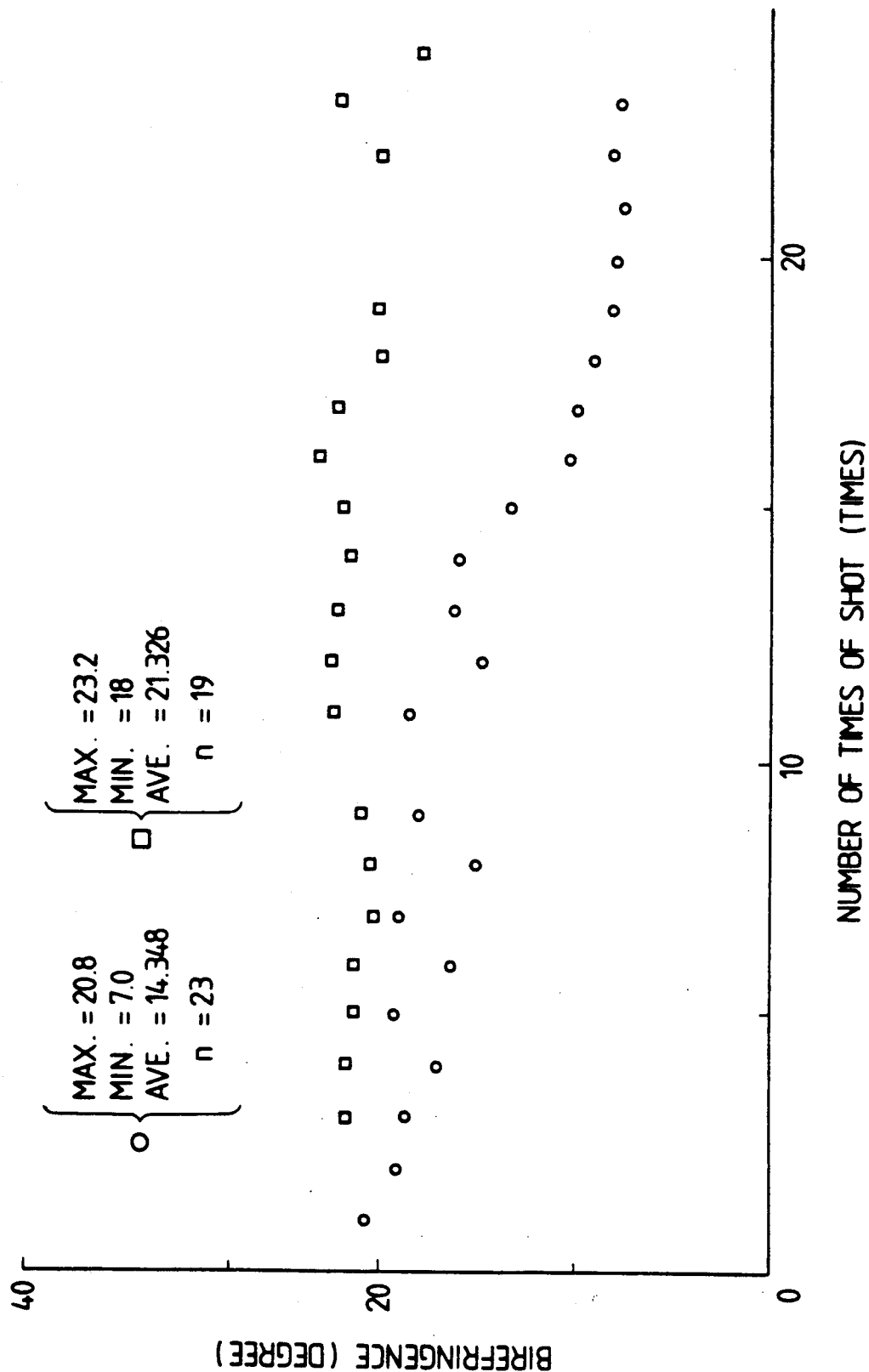

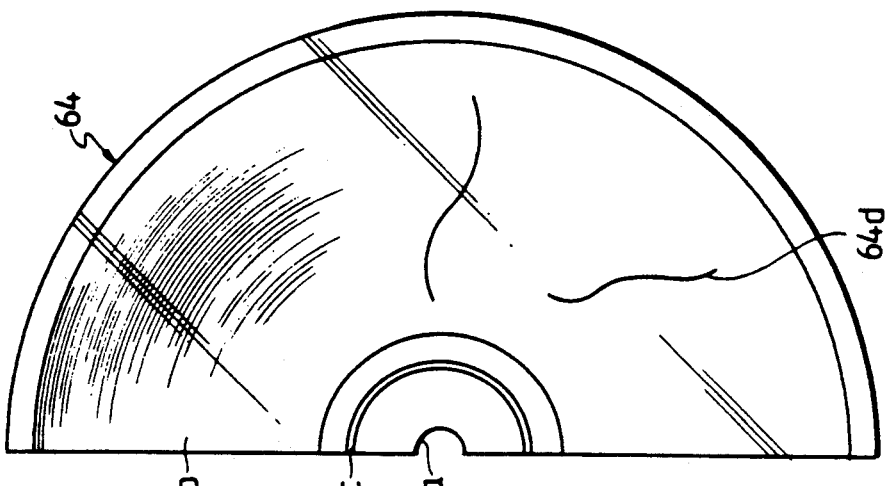
FIG. 9(b) PRIOR ART
FIG. 9(a) PRIOR ART
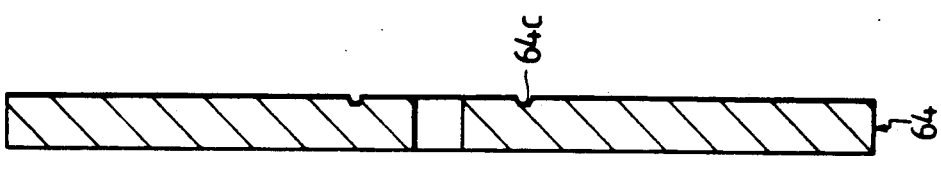
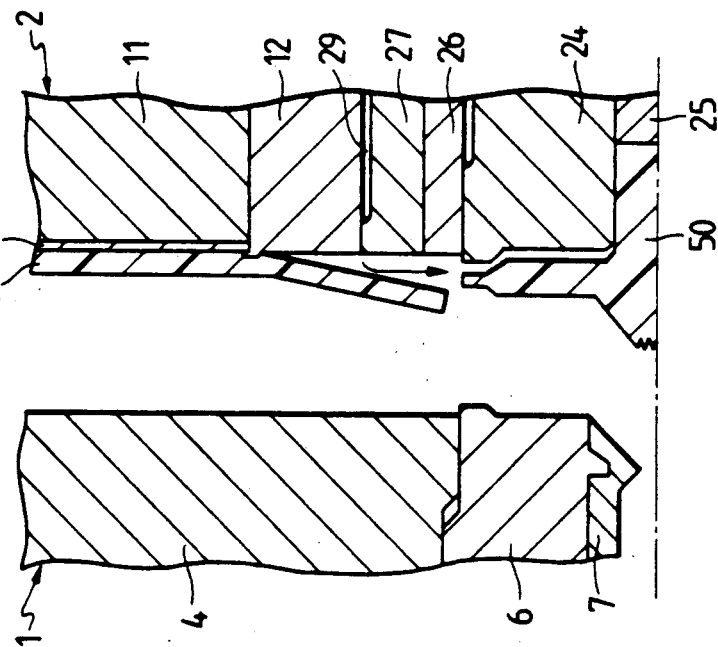
FIG. 8 PRIOR ART

APPARATUS FOR INJECTION MOLDING INFORMATION RECORDING DISKS

BACKGROUND OF THE INVENTION

1. Field of the Invention

The present invention relates to substrates of information recording disks and apparatus and method for injection molding the same.

2. Description of the Prior Art

Most transparent substrates of information storage disks such as optical disks or the like have been formed by molding material such as PC (polycarbonate) or PMMA (polymethyl methacrylate) through molding with an injection molding apparatus.

FIG. 6 is a schematic sectional view showing a clamped condition of a mold of a conventional apparatus for injection molding information recording disks. The mold of such a conventional apparatus has a fixed mold body 1 and a movable mold body 2 which are arranged as a pair.

The fixed mold body 1 comprises a fixed seat 3, a disk-shaped fixed mirror plate 4 which has a surface for forming one of the surfaces of the substrate to be formed, and a retainer plate 5 for retaining the fixed mirror plate 4 onto the fixed seat 3. A pipe-shaped spool bush 6 is inserted into the fixed mirror plate 4 to extend through the center of the fixed mirror plate 4. A spool 7 ia provided within the spool bush 6 so that when melted molding material is injected from a nozzle 8 of an injection mechanism, the spool 7 directs the melted material into a mold space 9 defined by molding the surfaces of the mold.

On the other hand, the movable mold body 2 is formed of a movable seat 10, a disk-shaped movable mirror plate 11 having a surface for supporting a stamper, and a retaining plate 5 for fixing the movable mirror plate 11 to the movable seat 10. A pipe-shaped inner circumferential clamp 12 and an circumferential outer clamp 13 are provided on the movable mirror plate 11 at the portions thereof corresponding to outer circumference and inner circumference of the stamper. The outer clamp 13 has a molding surface which defines the outer circumference of the substrate to be formed. A cutting mechanism for boring a center hole in the substrate of material which has been cured is provided at the center of the movable mirror plate 11.

The fixed mold body 1 is secured to a certain retaining member (not shown) so that the nozzle 8 of the injection mechanism fits in the spool 7. The movable mold body 2 is connected to a mold clamping means, for example, a hydraulic cylinder mechanism 100 for applying a mold clamping force to the movable mold body 2 to urge the movable mold body against the fixed mold body 1, so that the movable mold body 2 can move in a direction (indicated by arrow S) perpendicular to the opposing molding surfaces of the mold bodies 1 and 2. Further, an injection mechanism (not shown) for injecting melted molding material such as PMMA (polymethyl methacrylate) resin through the nozzle 8 thereof is provided within the mold space defined between the respective opposing molding surfaces of the movable mold body 2 and the fixed mold body 1.

FIG. 7 is a sectional view of the cutting mechanism and its vicinity depicted by a circle A shown in FIG. 6. The stamper 20, which forms part of a molding surface 19 of the movable mirror plate 11, for forming signal recording pits on the substrate to be formed is secured to the movable mirror plate 11 by a force along the outer circumferential portions of the stamper 20 by means of the outer circumferential clamp 13 and, also by a force along the inner circumferential portion of the stamper by the inner circumferential clamp 12, respectively. The inner clamp 12 is supported by a lock bar 21. A groove 22 is provided within the movable mold body 2 so that cooling water passes through. The inner circumferential clamp 12 has an annular protrusion 23 having a generally triangular cross section which protrudes into the mold space 9 and which urges the inner circumference of the stamper 20 against the movable mold body 2 so as to secure the stamper to the latter.

A pipe-shaped punch 24 which is provided at the central portion of the movable mirror surface plate 11 in a manner so that the punch 24 is movable in a direction of an arrow S and is surrounded by the inner clamp 12 which is in the form of a hollow circular cylinder. The tip end of the punch 24 forms part of the aforementioned molding surface, that is, in this case a portion corresponding to a central hole of a substrate which is to be formed by cooling and curing the melted molding material injected therein. The punch 24 is connected to the output shaft of a hydraulic cylinder mechanism (not shown) so that it is driven in the direction of the arrow S. An eject pin 25 is provided within the punch 24 so as to be movable in reciprocating fashion in the direction of the arrow S to thereby release the portion of the molding material corresponding to the central hole that is punched out by the punch. This eject pin 25 is driven by the hydraulic mechanism which is not shown. These elements form the cutting mechanism.

A cylindrical ejector 26 and a cylindrical fixed sleeve 27 are provided between the inner circumferential clamp 12 and the punch 24. The ejector 26 is arranged to be driven by the hydraulic cylinder mechanism so as to be movable in reciprocating fashion in the direction of arrow S to push the molded substrate in order to separate it from the movable mirror plate 11. The fixed sleeve 27 is secured to the movable mold body 2 by means of a bolt or the like and arranged to guide the movement of the ejector 26. An air blow groove 29 is provided on the side surface of the fixed sleeve 27 which faces the inner circumferential clamp 12. The air blow groove 29 communicates with an external gas supply pump 30 through a groove formed in the sleeve 27 through machining in the longitudinal direction of the fixed sleeve 27. When the molded substrate is to be released from the mold, pressurized gas from the gas pump 30 is passed through the air blow groove 29 and is injected through a small gap between the inner circumferential clamp 12 and the fixed sleeve 27 so that the substrate is pushed to separate it from the movable mirror plate 11. These elements form a mold release mechanism.

The fixed mold mirror plate 4 of the fixed mold body 1 has a die portion 40 having an inner circumferential edge which corresponds to the punch 24 of the mold release mechanism forming part of the molding surface. The die portion 40 cooperates with the tip end of the aforementioned punch 24 so as to punch out the central hole of the substrate. The tip end of the punch 24 and the circular spool bush 6 surrounded by the die portion 40 form a runner and a gate. The spool 7 guides the melted molding material injected from the nozzle 8 into the mold space. Additionally, the knockout, that is, the spool bush 6 and the nozzle 8 are retracted prior to protrusion operation of the punch.

Next, the operation of the information recording disk injection molding apparatus will be described hereunder.

First, the fixed mold body 1 is firmly urged against the movable mold body 2 so as to perform mold clamping with the mold space 9 formed in the mold. Subsequently, the melted molding material is injected and guided into the mold space 9 by the spool 7. Then, the melted molding material is cooled and cured to thereby form a molded substrate.

Thereafter, the punch 24 is protruded by a predetermined distance. By operating the punch 24 in this manner, the spool bush 6 and the nozzle 8 are retracted together with the center hole portion which is punched out, whereby the central hole is formed in the substrate.

As depicted by an arrow in FIG. 8, the movable mold body 2 is then moved sufficiently away from the fixed mold body 1 sufficient and the eject pin 25 protrudes to push out the spool-forming portion 50 from the punch. FIG. 8 is an enlarged sectional view of the mold release mechanism and the cutting mechanism in a portion indicated by a circle B in FIG. 7, in the mold release step.

Next, in the mold release step, a substrate 64 is released from the movable mold body 2 by means of the pressurized gas supplied through the air blow groove 29. The substrate 64 is then separated from the movable mold body 2 by means of the ejector 26 which protrudes thereto, so as to be collected.

Thus, such a substrate 64 as shown in FIG. 9 is obtained. In the main surface of the substrate 64, an annular groove 64c corresponding to the annular protrusion 23 is formed between a central hole portion 64a and an information recording region 64b.

Many of the substrates manufactured in this manner have been defective because the linear patterns as designated by a reference numeral 64d, called a molding stain which has a different color than the remainder of the substrate portion, may occur in the main surfaces of the substrate 64 obtained in this fashion. Further, the flow, orientation, and pressure distribution of the molding material are not fixed, and therefore it is difficult to make the birefringence of the substrate uniform.

Further, with the conventional apparatus for injection molding a substrate of an information recording disk, the pressurized gas for separating the molded substrate 64 from the stamper 20 flows to outside, as shown by an arrow in FIG. 8, through the central hole portion which has been punched out. Thus the pressurized gas is not distributed uniformly over the enter surface of the substrate 64, causing the substrate 64 and the mold to separate non-uniformly. Further, there is a shortcoming that if the inner and outer circumferential portions are separated from the mold at different times, the pits formed on the disk may be damaged.

SUMMARY OF THE INVENTION

It is therefore an object of the present invention to overcome the foregoing disadvantages in the prior art.

It is another object of the present invention to provide a substrate of an information recording disk in which damage to the pits formed in an information recording region is minimized and pressure distribution of a molding material during molding is regulated, and to provide an injection molding apparatus and method therefor.

To attain the above objects, according to an aspect of the present invention, the substrate of an information recording disk has at least one annular uneven region formed in a main surface of the substrate between a central hole portion and an information recording region.

According to another aspect of the present invention, the apparatus for injection molding a substrate of an information recording disk comprises: a pair of mold bodies respectively having molding surfaces opposed to one another so as to form a mold space therebetween the mold bodies being movable relative to each other in a direction substantially perpendicular to the molding surface; a mold clamping means for clamping the mold bodies; an injecting means for injecting melted molding material into the mold space after mold clamping; a cutting means provided on one of the mold bodies for cutting the cured molding material; a pressurized gas supplying means provided on the one molding surface and having an opening for supplying the pressurized gas, for releasing the cured molding material from the mold; and an annular uneven region formed in one molding surface between the cutting means and the opening.

According to a further aspect of the present invention, the method of injection molding a substrate of an information recording disk by a pair of mold bodies arranged so that respective molding surfaces thereof for defining a mold space therebetween are opposite to one another in the direction substantially perpendicular to the molding surfaces, comprises the steps of: clamping the mold bodies to form the mold space; injecting melted molding material into the mold space; cutting a portion of the molding material after it has been cured; and supplying pressurized gas between the molding surfaces and the cured molding material so as to release the cured molding material from the mold bodies, in such a manner that the cured molding material is left as it is in close contact with the molding surfaces for a period of time, for example 0.4–1.9 seconds, after the mold bodies have been opened and then the pressurized gas is made to flow in from edge portions of the molding surfaces toward the main surfaces thereof.

BRIEF DESCRIPTION OF THE DRAWINGS

These and other features, objects and advantages of the present invention will be apparent from the following detailed description with reference to the accompanying drawings, in which:

FIG. 5 is a graph showing birefringence of the substrates of information recording disks according to the present invention and a conventional apparatus. respectively;

FIGS. 7 and 8 are enlarged sectional views showing the major part of the conventional injection molding information recording disk injection molding apparatus; and FIGS. 9(a) and 9(b) are a sectional and a fragmentary plain view showing a conventional substrate of an information recording disk, respectively.

DETAILED DESCRIPTION OF THE PREFERRED EMBODIMENTS

Figure 7:
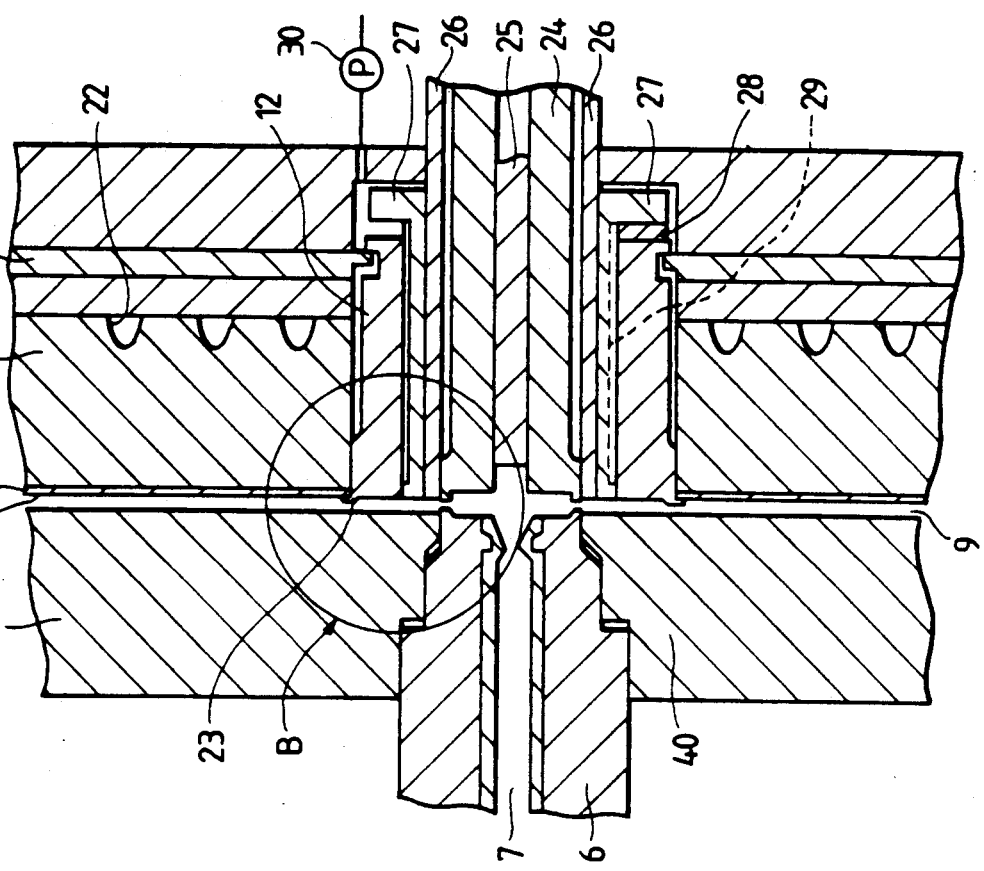

Referring to FIGS. 1 through 5, an embodiment of an apparatus for injection molding substrates of information recording disks according to the present invention will now be described. The apparatus for injection molding information recording disks according to the present invention is arranged in a manner similar to that shown in FIGS. 6 through 8, and thus detailed description is not given.

Figure 1:
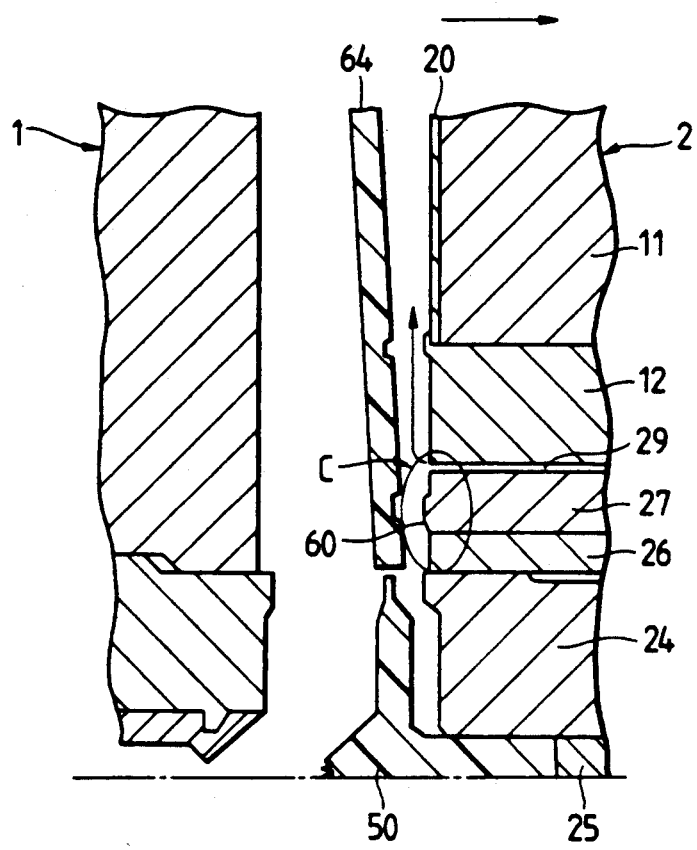
FIG. 1, FIG. 2(a), FIG. 2(b), and FIG. 2(c) are enlarged sectional views of the major part of an embodiment of the apparatus for injection molding a substrate of an information recording disk according to the present invention.
Figure 2A:
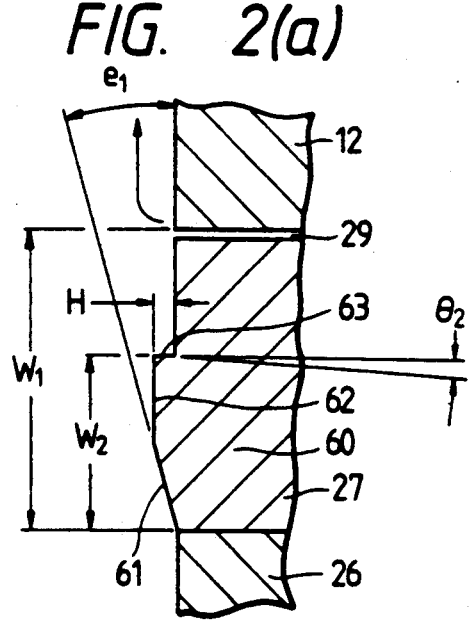
Figure 2B:
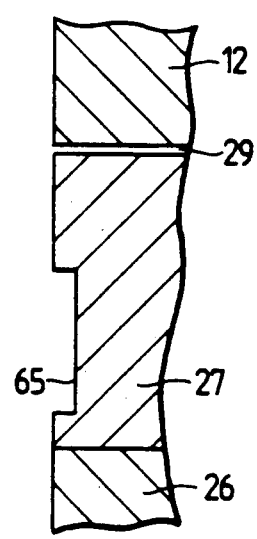
Figure 2C:
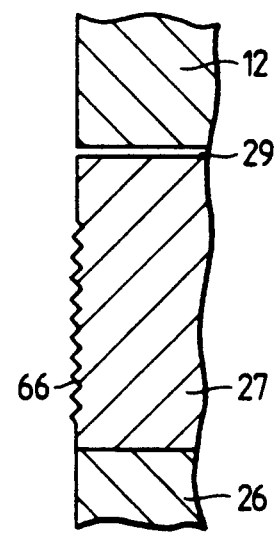
Figure 6:
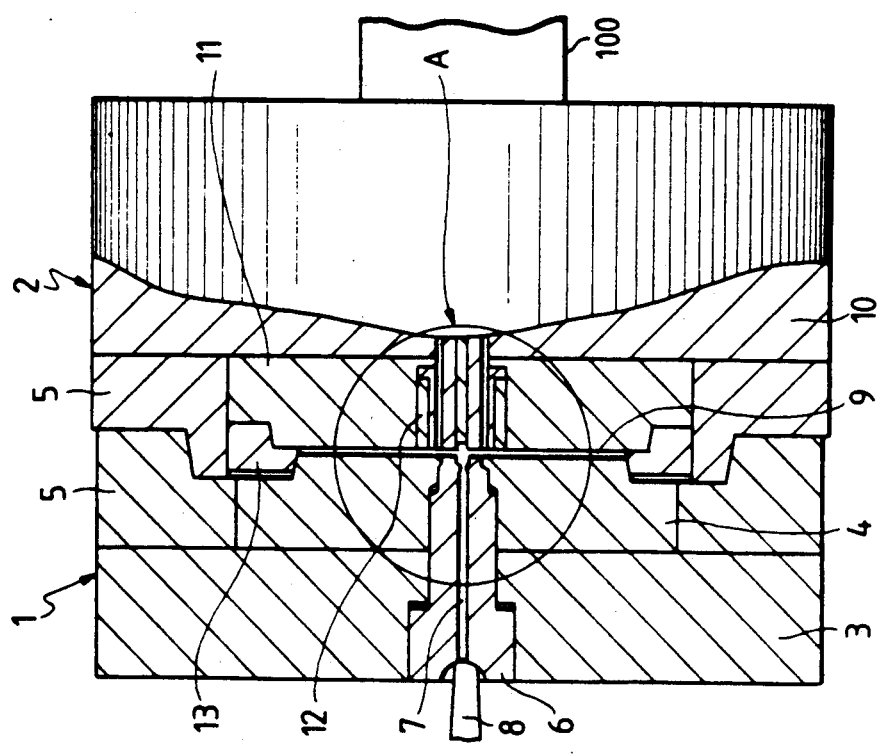
FIG. 6 is a schematic side view partly in section shoWing the mold bodies of the conventional information recording disk injection molding apparatus.

In the following description, elements similar to or corresponding to those of the apparatus for injection molding information recording disks shown in FIG. 6 have been given the similar reference numerals. FIG. 1 is an enlarged sectional view of a cutting mechanism and a mold release mechanism of an embodiment of the present invention. FIGS. 2(a), 2(b) and 2(c) are alternative enlarged sectional view of the cutting mechanism and the mold release mechanism of a portion shown by a circle C in FIG. 1.

In the apparatus for injection molding substrates of information recording disks as shown in FIGS. 1 and 2(a), 2(b) and 2(c), an annular protruding portion 60 is formed in the molding surface or end surface of a fixed sleeve 27 facing the mold space.

The annular protruding portion 60 has a trapezoidal shape in section in the radial direction thereof. For example, in the case where the pipe-like fixed sleeve 27 has a pipe thickness $W_1$ of 5 mm, the annular protruding portion 60 is formed so as to have a width $W_2$ of 3 mm and a height H of 0.4 mm and so as to be composed of tapered surface 61 which is tapered at a taper angle $\theta_1$ of 15° with respect to the molding surface, a parallel surface 62 continuous with the tapered surface 61, and an undercut surface 63 having an inclination angle $\theta_2$ with respect to the longitudinal direction of the fixed sleeve 27 so that the flow of PC, the melted molding material, is not disturbed.

The tapered surface 61 forms an obtuse angle with respect to the molding surface at the inlet side of the melted molding material. Although the undercut surface 63 has a radially outward overhanging shape, the surface 63 may be formed as an inclination surface substantially perpendicular to the molding surface at the outlet side of the melted molding material. The protruding portion 60 is provided on the end surface of the fixed sleeve 27 at the ejector side, so as to allow the pressurized gas injected from the air blow groove 29 through a gap between the inner clamp 12 and the fixed sleeve 27 to pass through a space between the molding surface of the fixed sleeve 27 and the formed substrate 64.

The operation of the illustrated embodiment of the apparatus for injection molding information recording disks embodied will now be described hereunder.

The operation of the embodiment is similar to the prior art apparatus up to the punching step. In the mold releasing step, as shown by an arrow in FIG. 1, since during the mold release process the substrate 64 shrinks to bite the undercut portion 63 at the protruding portion of the fixed sleeve and thus is in close contact with the undercut portion 63, so that the pressurized gas supplied to the air blow groove 29 cannot flow into the cut portion toward the inner circumference of the substrate but flows only toward the outer circumference of the substrate. Thus the pressurized gas is supplied all over the main surface of the substrate 64. In this manner, the substrate 64 is released from the movable mold body 2, and then the ejector 26 protrudes to separate the substrate from the movable mold body 2 for subsequent collection of the substrate 64.

Figures 3A, 3B:
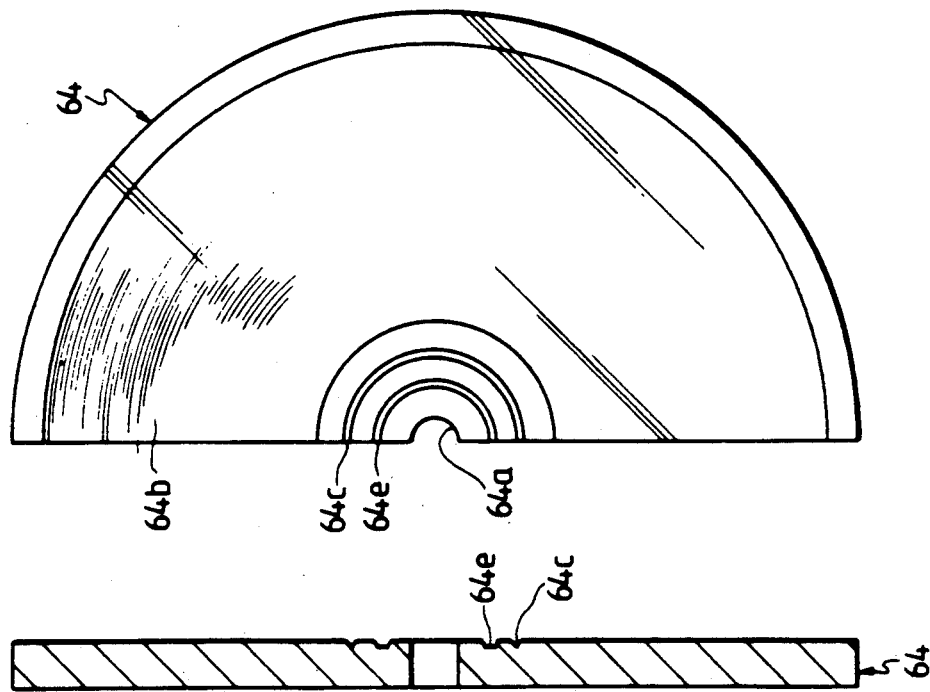
FIGS. 3(a) and 3(b) depict an area sectional and a fragmentary plain view showing a substrate of an information recording disk according to the present invention, respectively.

In this manner, such a substrate 64 as shown in FIG. 3 is obtained. An annular groove 64c corresponding to an annular protrusion 23 and an annular groove 64e corresponding to the annular protruding portion 60 having substantially trapezoidal shape are formed in the main surface of the substrate 64, between a central hole portion 64a and an information recording region 64b.

Table 1 shows the results of an experiment concerning molding stains generated in the substrates of the information recording disks obtained according to the embodiment of the present invention and obtained from the foregoing conventional apparatus.

Examples 1 through 3 were carried out while varying the injection timing for injecting a pressurized gas from the air blow groove 29, that is, varying the time from a point in time when the fixed and movable mold bodies are opened to a point in time when pressurized gas is injected. Similarly, comparative examples 1 through 5 which are directed to the conventional apparatus were carried out while varying the injection timing. A stamper under the same conditions was used in the Examples 1 through 3 as well as in the Comparative Examples 1 through 5. Table 1 also shows whether or not a mold release agent was applied onto the stamper in advance in order to effectuate mold release. A visual check was performed to determine if molding stains were generated. The rate of generation of molding stains is expressed as a percentage of the number of molded substrates in which molding stains were generated to the total number of all the molded substrates.

TABLE 1

|  | Condition of stamper (coated with mold-release agent or not) | Injection timing (sec) | Rate of molding (%) |
|---|---|---|---|
| Example 1 | Not-coated | 0.4 | 5.3 |
| Example 2 | Coated | 0.5 | 5.7 |
| Example 3 | Coated | 1.9 | 2.9 |
| Comparative Example 1 | Not-coated | 0.4 | 37.5 |
| Comparative Example 2 | Not-coated | 0.5 | 100 |
| Comparative Example 3 | Not-coated | 1.9 | 100 |
| Comparative Example 4 | Coated | 0.5 | 100 |
| Comparative Example 5 | Coated | 1.9 | 100 |

In the conventional apparatus, a time difference was occasionally generated in the mold releasing of one and the same substrate even though pressurized gas was injected from the air blow groove. That is, the substrate remained in close contact with the mold bodies after the substrate had been separated from the mold bodies, and as a result molding stains were generated in the substrate. In the Examples shown in Table 1, the mold release was performed uniformly so that no time difference was generated.

In the substrates generated by conventional apparatus, dark molding stains were generated as specific positions. In the substrates according to the present invention, however, the molding stains were faint in color and did not possess a specific color or position.

The molding stains described above are believed to be caused on the substrate due to the fact that the surface of the information recording region of the substrate is mechanically deformed and hence optically influenced by shearing force generated by a difference in contraction coefficient between portions of the molding material at the instant of separation of the substrate from the stamper.

The molding stain boundary occurred on the surface of the substrate in the information recording region at a portion where a degree of mechanical deformation varies. Therefore, it is believed that the molding stain resulted from a difference in shearing force which in turn resulted from variations in the contraction coefficient at portions of the substrate. These variations in the contraction coefficient were caused by the temperature difference of the substrate which is caused by a time lag in mold releasing, and a difference in hardness of the surface of the substrate in the information recording region.

FIG. 5 shows the results of a birefringence test with respect to the substrates of Example 1 and Comparative Example 1. In FIG. 5, the ordinate and the abscissa represent birefringence and the number of times of injection molding shot, respectively, and the symbols and represent plot values of Example 1 and Comparative Example 1, respectively. The average value of birefringence of n samples extracted from the substrates of a whole number of shots of Example 1 was compared with that of Comparative Example 1. The average value of birefringence of the substrates of Example 1 was 14.3 degrees, while that of substrates of the Comparative Example 1 was 21.326 degrees. Thus, the birefringence can be reduced by providing a groove in the substrate in the inner circumferential portion.

In the embodiment of the present invention, the annular protruding portion 60 is provided on the molding surface between the portion for cutting the substrate by means of a punch or the like, that is, the outlet portion for the pressurized gas, and the opening of the air blow groove 29 for releasing the substrate from the mold, thereby preventing unwanted flowing of air at this portion. It is preferable that a single annular protruding portion be provided in the form of a wide bank-shape so that the air-tightness will be greater than the case where a plurality of discrete annular protruding portions are provided.

Figure 4:
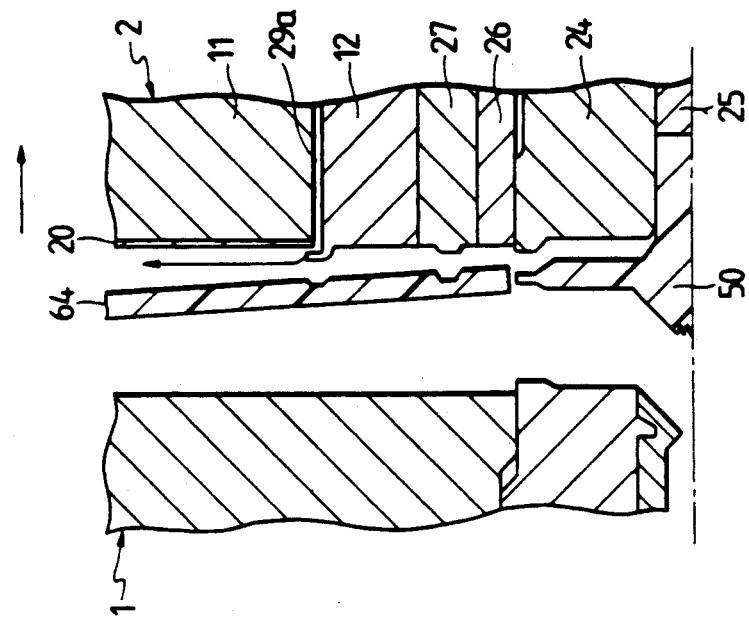
FIG. 4 is an enlarged fragmentary cross sectional view showing the major part of another embodiment of the apparatus for injection molding information recording disk substrates according to the present invention.

The invention thus far described has been discussed by way of an embodiment where the movable mold body 2 is provided with the air blow groove 29, the fixed sleeve 27 having a protrusion and so on, but these structural elements may also be provided on the fixed mold body 1. Further, in the alternative, an air blow groove 29a may be provided in a side surface between the moveable mirror plate 11 and the inner circumferential clamp 12 as shown in FIG. 4, so that pressurized gas may be injected through a gap between the annular protrusion 23 of the inner circumferential clamp 12 and the stamper 20 fixed thereto, With the same effects of the foregoing embodiment. Further, the air blow groove 29, the fixed sleeve 27 having a protrusion portion, etc., are provided in the vicinity of the central portion, but these may be provided in the vicinity of the outer circumferential portion of the same.

Further, the fixed sleeve is provided with the annular protrusion 60 having a substantially trapezoidal section (FIG. 2(a)), but instead of the protrusion 60, an annular recess 65 (FIG. 2(b)), or an annular rough surface portion 66 (FIG. 2(c)) may be formed in the fixed sleeve 27. In other words, according to the present invention, between the air blow opening and the air blow outlet on the mold body, a fixed sleeve 27 is provided, having an end surface that is provided with an annular close-contact region so that the substrate may not easily be released partially from the molding surface of the mold body and air-tightness can be maintained at that portion. In short, a gas blocking surface such as an annular uneven portion or a rough surface, etc., is provided to restrain ease of mold release and to permit the gas blow to pass only toward the data recording surface of the substrate.

As described above in detail, in the apparatus for injection molding substrates of information recording disks according to the present invention in which a melted molding material is injected into the mold space after a pair of mold bodies have been clamped together, the uneven surface area is provided on the molding surface of one of the mold bodies between the cutting means for cutting the cured molding material and the opening for supplying the pressurized gas for releasing the cured molding material from the mold bodies, so that the pressurized gas can be prevented from flowing out through a cut portion of the cured molding material. It is therefore possible to create a force generated by the pressurized gas to release the cured molding material uniformly from the stamper forming the molding surface to thereby preventing the pits in the information recording region on the main surface of the substrate from being damaged by non-uniform separation of the substrate from the mold.

In the mold releasing step of the method using the foregoing apparatus for injection molding substrates of information recording disks according to the present invention, the cured molding material was left as it was in close contact with the molding surface for 0.4–1.9 seconds after the mold bodies had been opened, and then the pressurized gas was made to flow through the air blow groove provided in the circumferential portion of the molding surface toward the main surfaces of the molding surfaces and the cured molding material. Accordingly, it is possible to obtain substrates of information recording disks in which generation of molding stains is minimized and if molding stains are generated they are faint in color.

The provision of an uneven region such as an annular groove or the like, on the main surface between the central hole portion and the information recording region, according to the present invention, the substrate of an information recording disk can be easily released from the mold and the generation of molding stains in the substrate can be minimized, and if molding stains are generated they are faint in color. Further, in the molding process, it is possible to obtain substrates of information recording disks in which birefringence is minimized due to the regulation of the distribution of pressure for molding the molding material.

What is claimed is:

1. An apparatus for injection molding a substrate of an information recording disk, comprising:
   a pair of mold bodies having molding surfaces opposed to each other so as to form a mold space therebetween, said mold bodies being movable relative to each other in a direction substantially perpendicular to said molding surfaces;
   a mold clamping means for clamping said mold bodies;
   an injecting means for injecting method molding material into said mold space after mold clamping;
   a cutting means provided on one of said mold bodies for cutting said molding material after said molding material has cured, said molding material forming said substrate after said molding material has cured;
   a pressurized gas supply means provided on a molding surface of said one of said mold bodies, said gas supply means having an opening for supplying pressurized gas to release said cured molding material from said mold; and
   an annular uneven region in said molding surface of said one of said mold bodies between said cutting means and said opening, said annular uneven region of said molding surface forming a corresponding annular uneven region within a side of said substrate, wherein a connection between said annular uneven regions form an airtight seal.

2. An apparatus for injection molding a substrate of an information recording disk as recited in claim 1, wherein said annular uneven region of said molding surface has a trapezoidal-shaped projection.

3. An apparatus for injection molding a substrate of an information recording disk as claimed in claim 1, wherein said annular uneven region of said mold surface comprises an annular protruding portion having a substantially trapezoidal cross section in a radial direction thereof and said annular protruding portion has a first inclination surface disposed at an inlet side of the melted molding material, said first inclination surface having an obtuse angle with respect to said molding surface of said one of said mold bodies.

4. An apparatus for injection molding a substrate of an information recording disk as claimed in claim 3, wherein said annular protruding portion has a second inclination surface disposed at an outlet side of said melted molding material, said second inclination surface being substantially perpendicular to said molding surface of said one of said mold bodies.

5. An apparatus for injection molding a substrate of an information recording disk as claimed in claim 3, wherein said annular protruding portion having a substantially trapezoidal cross section comprises:
   an outer surface portion parallel to said molding surface of said one of said mold bodies and;
   said first inclination surface connecting said molding surface of said one of said mold bodies to a first end of said outer surface portion; and
   an undercut inclination surface connecting said molding surface of said one of said mold bodies to a second end of said outer surface portion, wherein said second end is disposed closer to said opening than said first end.

6. An apparatus for injection molding a substrate of an information recording disk as claimed in claim 5, wherein said first inclination surface projects from said molding surface of said one of said mold bodies at an angle of substantially 15°.

7. An apparatus for injection molding a substrate of an information recording disk as claimed in claim 5, wherein said undercut inclination surface is inclined inwardly from said outer face portion to said molding surface of said one of said mold bodies.

8. An apparatus for injection molding a substrate of an information recording disk as claimed in claim 1, wherein said annular uneven region of said molding surface is an annular recess.

9. An apparatus for injection molding a substrate of an information recording disk as recited in claim 1, wherein said annular uneven region of said molding surface comprises alternating sawtooth-shaped projections and recesses.

* * * * *